Dec. 27, 1966  E. M. ROTHERMEL ETAL  3,294,607
METHOD OF MAKING FLEXIBLE REINFORCED CONDUIT
Original Filed March 30, 1959  2 Sheets-Sheet 1

INVENTORS
EDWARD M. ROTHERMEL
RUSSELL B. WADDELL, JR
BY

Reuben Wolk
ATTORNEY

Dec. 27, 1966   E. M. ROTHERMEL ETAL   3,294,607
METHOD OF MAKING FLEXIBLE REINFORCED CONDUIT
Original Filed March 30, 1959   2 Sheets-Sheet 2

INVENTORS
EDWARD M. ROTHERMEL
RUSSELL B. WADDELL, JR
BY

ATTORNEY

3,294,607
METHOD OF MAKING FLEXIBLE REINFORCED CONDUIT

Edward M. Rothermel and Russell B. Waddell, Jr., Waynesville, N.C., assignors to Dayco Corporation, a corporation of Ohio
Original application Mar. 30, 1959, Ser. No. 802,828, now Patent No. 3,152,618, dated Oct. 13, 1964. Divided and this application July 15, 1963, Ser. No. 298,516
6 Claims. (Cl. 156—144)

This application is a division of U.S. application Serial No. 802,828, filed March 30, 1959, now Patent No. 3,152,618, issued October 13, 1964.

The present invention relates to reinforced flexible conduit and particularly to such conduit which is fluid impervious and especially adapted for the transportation of fluid materials, particularly of a gaseous nature. The invention relates further to an improved method for the manufacture of such conduit.

Conduit of the general type referred to has been formed of a flexible tubular body portion composed of elastomeric or thermoplastic material circumferentially reinforced by means of axially spaced reinforcing turns provided by bonding to or embedding in the tubular body, a steel spring member the coils or which may themselves have been first coated with elastomeric or thermoplastic material. Such conduits are described and claimed in U.S. Patents 2,766,806, 2,782,803, and 2,822,857 and others. Conduit of this type has been found to be light in weight, durable and flexible and has found application in connection with household and industrial vacuum cleaners oxygen systems particularly for supplying oxygen to aircraft crew members, respiratory devices, gas and liquid fuel supply systems and the like.

Conduit of the type described in the prior art has generally been formed by surrounding the reinforcing member with the tubular body and bonding it thereto or by embedding such reinforcing member wholly or partially within the tubular body. Products of this type have usually resulted in conduit in which the reinforcing member is exposed within the inner surface of the tube or in cases where complete embedment has resulted, the product has required a substantial thickness or has resulted in products which do not possess the maximum degree of flexibility which may be required.

It is accordingly an object of the present invention to provide a fluid impervious conduit which is at once extremely flexible and which is reinforced against radial compression and collapse.

It is a further object of the present invention to provide a fluid impervious conduit having a corrugated exterior surface and in which the tubular body is positioned within and bonded to the inner surface of the reinforcing member.

It is a still further object of the present invention to provide a conduit in which the tubular body member is bonded to the inner surface of the reinforcing member and in which an outer tubular body is positioned over the reinforcing member in a manner which will provide substantial strength without substantially affecting the flexibility of the hose.

It is a still further object of the present invention to provide reinforced corrugated conduit in which the reinforcing member surrounds and is bonded to an inner tubular layer and wherein an outer tubular layer of the same or different composition surrounds the reinforcing member and engages it without being bonded thereto.

It is a still further object of the present invention to provide a method for the manufacture of a hose of the type described which will be simple, efficient and of low cost.

Further objects will appear from a consideration of the specification and drawing as described below.

It is seen that the present invention provides an improved conduit construction as well as a novel method for the manufacture thereof which will produce such conduit having improved flexibility and strength in a simple and effective manner and which permits considerable variation in structure and composition. These results are achieved by forming a reinforcing member of spaced convolutions of predetermined diameter in the form of a spring or spaced annular turns or the like, said convolutions being preferably first coated with a layer of elastomeric or thermoplastic material, forming a tubular member of elastomeric or thermoplastic material of a predetermined diameter less than the diameter of the reinforcing member, expanding the tubular member within its elastic limits so that it engages the inner surface of the reinforcing member and becomes bonded thereto, and thereafter allowing the inner tubular member to resume its normal diameter. The resultant product is one in which the tubular body is bonded to the reinforcing member which surrounds it along the inner periphery of said reinforcing member with the result that the bonded areas of the tube are restrained while the unbonded areas between convolutions of the reinforcing member are depressed due to the tendency of the tube to resume its normal diameter. A corrugated product is thereby formed in which the corrugations of the tube are in tension. The resulting product is preferably strengthened and reinforced by positioning an outer tubular layer of resilient material over the reinforcing member in such a manner that the second tubular layer is also formed to have a diameter less than that of the reinforcement and is expanded and positioned over the reinforcemnt after which it is allowed to relax and embrace the convolutions of the reinforcement so that it too will have a corrugated configuration.

The material of which the tubular body is formed may be selected from the resilient somewhat elastic materials represented by natural or synthetic rubber and certain plastic materials also having resiliency and elasticity. These plastic materials are generally of thermoplastic nature, such as polyvinyl chloride, polyethylene and the like. When vulcanizable material, such as natural or synthetic rubber is used, it is utilized in the partly vulcanized or vulcanized state since it will possess the required degree or inherent elasticity in such condition. The reinforcements may be of steel, aluminum, or other metal, or may be of rigid plastic such as nylon, polystyrene, etc.

The above described principles and advantages of the present invention may be more clearly understood by the following description in connection with the accompanying drawing in which, FIG. 1 is a view partly in cross section and partly in elevation illustrating one step in manufacture of the product of the invention.

Figure 1:
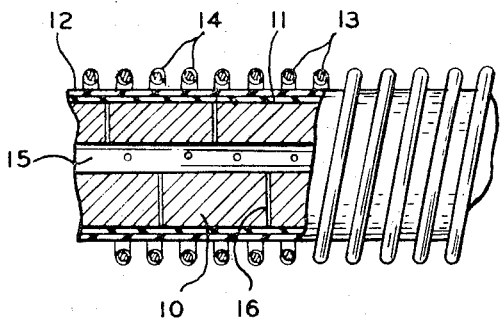
Figure 2:
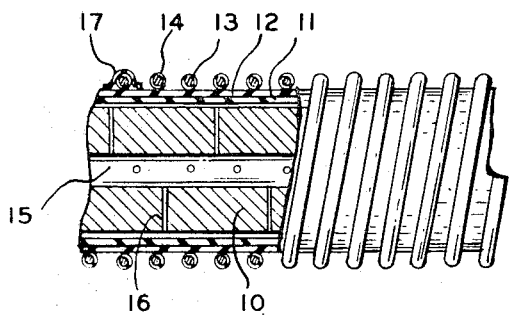
FIG. 2 is a view partly in elevation and partly in cross section illustrating a later step in the manufacture of the invention.

As shown in FIG. 1, mandrel 10 is provided with an expansible elastic covering member 11, commonly known as an air bag, which is formed of elastic or stretchable material such as vulcanized rubber or the like. The mandrel and air bag are of such dimensions that the air bag fits snugly over the mandrel and the diameter of the air bag is slightly less than the diameter of elastomeric tube 12 which is drawn thereover. Tube 12, which may be formed by extrusion, is of elastomeric material referred to above and is formed of a diameter which represents the normal inner diameter of the conduit to be produced and which is normally smaller than the inner diameter of the reinforcing members as described further below. Preferred materials for the tube 12 are elastic thermoplastic materials such as polyvinyl chloride or polyethylene, or vulcanized or partially vulcanized natural or synthetic rubber, in order that the tube may be stretched and thereafter relaxed to normal diameter. After tube 12 is placed over the air bag on the mandrel, reinforcement 13 in the form of spaced convolutions of a steel spring, is positioned over the tube as shown. The convolutions are formed with a diameter which will conform to the desired outer diameter of the conduit plus any outer tube or layer applied thereto, and also the convolutions of the spring are also preferably coated with a layer 14 of elastomeric material which may be of the same type as the tube but not necessarily so. Mandrel 10 is provided with an inner bore 15 and radial passages 16 extending between the bore and the surface of the mandrel. As illustrated in FIGURE 2, upon the introduction of air or other fluid under pressure internally of the mandrel the fluid causes air bag 11 to expand and stretch carrying with it tube 12. The expansion is carried out sufficiently to cause tube 12 to press against the inner periphery of the reinforcing turns of member 13 and against coating 14 thereon. This enables the tube to become bonded to the inner surfaces of the reinforcement. In order to properly effectuate this bond, the tube may be first coated with a suitable adhesive and the internal pressure is retained until the adhesive becomes set. In lieu of using an adhesive, and particularly where the tube and the coating on the reinforcement are of a thermoplastic nature, heat may be applied preferably in a localized manner by conducting electric current through the wire of the reinforcement, which causes softening of the tube and the coating on the wire at their points of contact. Upon discontinuance of the electric current and cooling of the wire the thermoplastic material becomes set and an integral bond takes place between the tube and the coating on the wire. If desired, the entire assembly may be introduced into a heating zone of an induction furnace and the wire may be heated and the localized heating of the wire may take place by induction. Where the tube and the coating on the wire are of partially vulcanized rubber, bonding may be effected by introducing steam or hot air into the air bag with the resultant heat enabling the tube and the coating on the wire to become completely vulcanized while in pressure engagement with each other. In case both tube and coating on the wire are of vulcanized rubber a bond may be obtained by the use of an adhesive such as a rubber or resin cement or a rubber solvent applied to the wire or to the tube or both before contacting them. Once the bond has been effected, the internal pressure upon the air bag is released and the resultant assembly removed.

Figure 3:
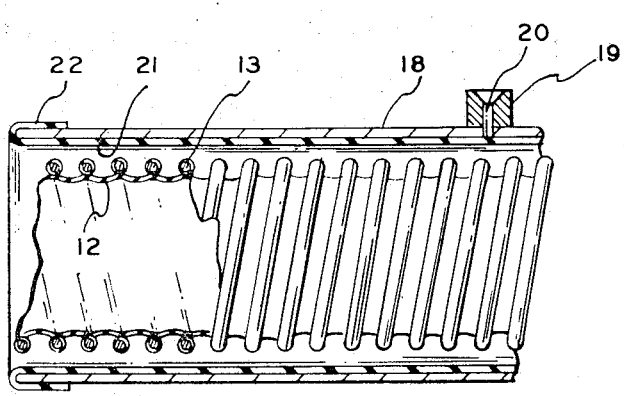
FIG. 3 is a view partly in elevation and partly in cross section illustrating the product resulting from the steps illustrated in FIGS. 1 and 2.
Figure 4:
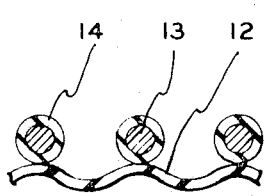
FIG. 4 is an enlarged cross-sectional view of a portion of the hose of FIG. 3.

As shown in FIG. 3 the assembly consists of a tube 12 to which reinforcement turns 13 are bonded along the outer surface of the tube and at the inner periphery of the reinforcement as shown. In view of the inherently elastic nature of the material of the tube it tends to return to its original diameter which is less than the diameter of the reinforcement with the result that corrugations or convolutions are formed depending between the reinforcement turns as shown. The resultant product may in many cases by utilized in this form in case a single tube having a light weight construction is desired. This would be particularly true in cases where the conduit is to be utilized with fluid having a low positive or negative pressure since the stress upon the bond between the reinforcement and the tube would not be especially high.

Figure 5:
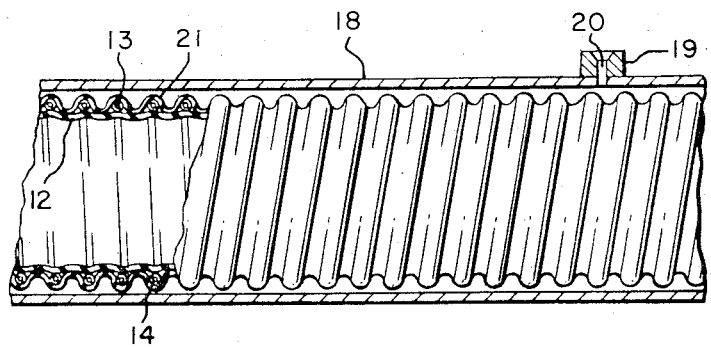
FIG. 5 is a view partly in cross section and partly in elevation illustrating a final step in the manufacture of another product of the invention.
Figure 6:
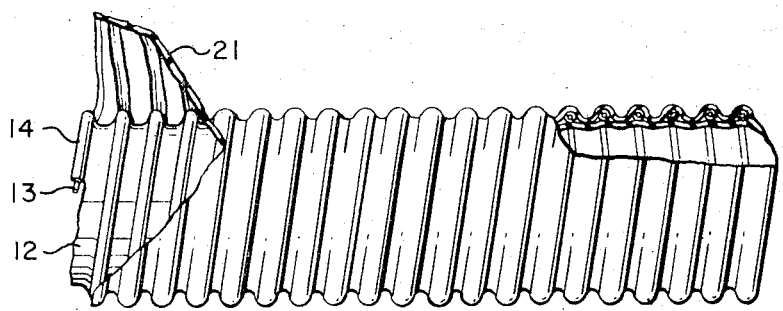
FIG. 6 is a view in elevation and partly in cross section illustrating the structure of the product made in accordance with the steps of FIG. 5.
Figure 8:
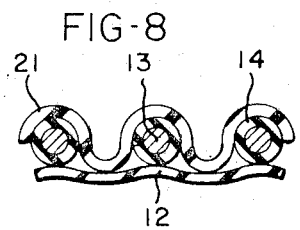
FIG. 8 is an enlarged cross-sectional view of a portion of the hose of FIG. 7.

However, for most purposes additional reinforcement of the tubular member is desired and in such cases a second tubular layer is applied thereover in the manner illustrated in FIG. 5. As shown, the assembly of FIG. 3 is positioned within an expansion chamber 18. This chamber is provided with a fitting 19 which is provided with a passageway 20 connected to a source of vacuum, such as a vacuum or exhaust pump. Within the tubular chamber 18 is positioned tube 21 the ends of which are cuffed over the edge of the chamber in order to seal the space between the tube and the inner wall of the chamber in order that the tube may be expanded by suction by being drawn inwardly against the wall of the chamber when suction is applied. The tube 21 is initially formed by extrusion or otherwise to have a diameter corresponding substantially to the initially formed outer diameter of tube 12 while the expansion chamber has a suitably greater inner diameter. As a result and as illustrated in FIG. 5, when the vacuum is released, tube 21 will tend to return to its original diameter and frictionally embrace the reinforcement 13 as well as tube 12 to form a second outer layer surrounding the reinforcement and the inner tube. The resulting product is then removed from the chamber and will possess the structure illustrated in FIG. 6. As shown in that figure, reinforcing member 13 with its coating 14 is bonded to inner tube 12 which depends inward under tension between the coils of the reinforcing member. Outer tube 21 surrounds and embraces the reinforcement and the inner tube under tension and conforms to the corrugations thereof but is unbonded thereto. This is further illustrated in FIG. 8.

Figure 7:
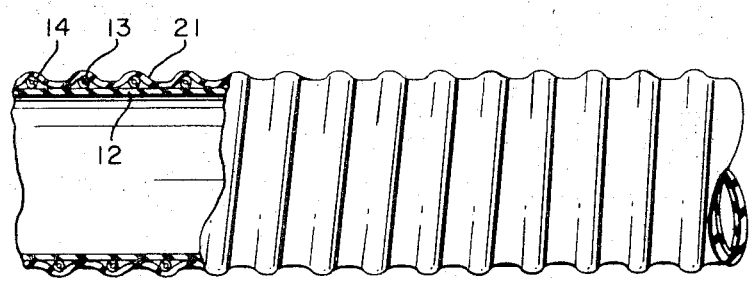
FIG. 7 is a view partly in elevation and partly in cross section showing the product of FIG. 6 in an axially elongated condition.

As will be seen in FIG. 7 the resulting product may be freely elongated axially of the hose by stretching in which condition the interior will be relatively nonobstructed and of increased diameter due to the fact that the depending convolutions of the tubes have become elongated as the axial stress is applied. This results in the inner tube elongated between convolutions and the outer tube also being elongated since it is in frictional engagement with the outer surface of the reinforcement and the exposed surface of the inner tube. Some slippage of the outer tube with respect to the inner assembly will occur when the conduit is stretched or bent.

Figure 9:
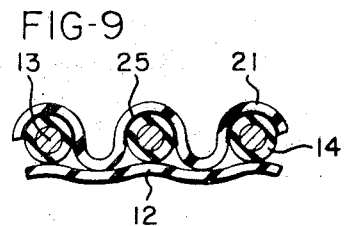
FIG. 9 is a view similar to FIG. 8 illustrating a modified form of the invention.

A modified form of the invention is illustrated in FIG. 9 in which tube 12 is provided to which reinforcing member 13 and its elastomeric covering 14 are bonded in a manner described above in connection with FIGS. 1 to 3. Prior to the application of the outer tube 21 a fabric tape 25 is applied over the convolutions of the reinforcement as shown, in order to provide additional reinforcement in this area. The tape may be of a somewhat elastic and stretchable fabric so that it may be applied under tension in which case bonding may be unnecessary. However, in general it is preferred to bond the tape over the convolutions of the spring by first applying adhesive thereto, such as a rubber cement. The outer tube is then applied in the manner described in FIGS. 3, 5 and 6. This construction is desirable in cases where deep convolutions are desired which would result in considerable degree of stress upon the elastomeric tubes but will provide a hose having a high degree of stretch. These deep convolutions are obtained by forming the tubes to a diameter of substantially less than that of the reinforcement which would mean that during fabrication the tubes are stretched to a correspondingly greater degree and upon relaxation will be drawn down between convolutions of the reinforcement to a point considerably below the inner surfaces of the reinforcement to produce deep convolutions. At the same time, this will tend to draw the convolutions together and shorten the hose. On the other hand when the hose is stretched, the degree of stretch will be determined by the depth of the convolutions.

In view of the fact that the outer tube in this conduit need not be bonded, the conduit may be formed utilizing a pair of tubular members which are not necessarily of the same composition and which would otherwise be incompatible by fusing or vulcanization or which would be difficult to bond together. Thus the inner tube may be of rubber or polyvinyl chloride and the outer tube of polyethylene, or vice versa. The outer tube may be of a material which is especially resistant to factors to which the outer surface is exposed and may be of especially wear or abrasion resistant material, or material which is resistant to sunlight and similar conditions. As one example of such a combination, the conduit may be formed of an inner layer of rubber or polyvinyl chloride and an outer layer of butyl rubber, neoprene, or chlorosulfonated polyethylene.

We claim:

1. A method for the manufacture of flexible reinforced conduit comprising the steps of forming a tube of elastomeric material having a predetermined diameter, positioning thereover a circumferential reinforcing member having axially spaced coils with an inner diameter greater than the diameter of said tube, radially expanding said tube within its elastic limits to cause portions of its outer surface to engage the inner surfaces of said coils, bonding the so engaged surfaces to each other and releasing said tube from its expanded position to cause said tube to depend inwardly between said coils.

2. A method according to claim 1 in which bonding is carried out by heating the contacting surfaces of the coils and the tube.

3. A method according to claim 2 in which said coils comprise metal and the heating is carried out by the passage of electric current through said coils.

4. A method according to claim 2 in which said coils comprise metal and the heating is carried out by induction heating of said coils.

5. A method according to claim 1 in which bonding is carried out by applying an adhesive between the contacting surfaces of the tube and the coils.

6. A method according to claim 1 including the steps of preforming a second tube of elastomeric material having a diameter less than the outer diameter of the reinforcing member, radially expanding said second tube within its elastic limit to a diameter greater than that of the reinforcing member, positioning the assembled first tube and reinforcing member within said second tube while it is in the expanded state, and releasing said second tube from its expanded state to cause portions of said second tube to embrace said coils and to cause the other portions thereof to depend inwardly between said coils.

References Cited by the Examiner
UNITED STATES PATENTS

| | | | |
|---|---|---|---|
| 2,570,259 | 10/1951 | McKinley | 156—143 |
| 2,743,759 | 5/1956 | Snow et al. | 156—143 |
| 2,822,857 | 2/1958 | Rothermel et al. | 156—144 |
| 2,941,571 | 6/1960 | Rothermel | 156—275 X |
| 3,076,737 | 2/1963 | Roberts | 138—122 X |

EARL M. BERGERT, *Primary Examiner.*

P. DIER, *Assistant Examiner.*